United States Patent
Sadeghian Marnani et al.

(10) Patent No.: US 12,429,496 B2
(45) Date of Patent: Sep. 30, 2025

(54) ARRANGEMENT FOR AND METHOD OF DETERMINING CANTILEVER DEFLECTION IN A SCANNING PROBE MICROSCOPY SYSTEM

(71) Applicant: Nearfield Instruments B.V., Rotterdam (NL)

(72) Inventors: Hamed Sadeghian Marnani, Rotterdam (NL); Arseniy Kalinin, Rotterdam (NL); Kevin Henri Louis Makles, Rotterdam (NL)

(73) Assignee: Nearfield Instruments B.V., Rotterdam (NL)

( * ) Notice: Subject to any disclaimer, the term of this patent is extended or adjusted under 35 U.S.C. 154(b) by 370 days.

(21) Appl. No.: 18/034,478

(22) PCT Filed: Nov. 3, 2021

(86) PCT No.: PCT/NL2021/050675
§ 371 (c)(1),
(2) Date: Apr. 28, 2023

(87) PCT Pub. No.: WO2022/098234
PCT Pub. Date: May 12, 2022

(65) Prior Publication Data
US 2023/0393169 A1 Dec. 7, 2023

(30) Foreign Application Priority Data
Nov. 4, 2020 (NL) ...................... 2026823

(51) Int. Cl.
*G01Q 20/02* (2010.01)
(52) U.S. Cl.
CPC ..................... *G01Q 20/02* (2013.01)
(58) Field of Classification Search
CPC ....................................... G01Q 20/02
See application file for complete search history.

(56) References Cited

U.S. PATENT DOCUMENTS

2004/0108593 A1* 6/2004 Oda ................ G02B 6/4214
257/734
2020/0116754 A1* 4/2020 Sadeghian Marnani ..................
G01B 9/02057

FOREIGN PATENT DOCUMENTS

| DE | 102007025240 A1 | 12/2008 |
| JP | 2004-279195 A | 10/2004 |
| JP | 2007-248168 A | 9/2007 |

OTHER PUBLICATIONS

Schaffer, Timothy et al., Array detector for the atomic force microscope, Applied Physics Letters, vol. 76, No. 24, Jun. 12, 2000.
(Continued)

*Primary Examiner* — Nicole M Ippolito
(74) *Attorney, Agent, or Firm* — Banner & Witcoff, Ltd.

(57) ABSTRACT

The invention is directed at an arrangement for determining cantilever deflection in a scanning probe microscopy system. The system includes a scan head supporting a probe, including the cantilever and a probe tip, comprising a specular reflective surface. The arrangement comprises an optical source for providing an optical beam. The optical beam is impinged onto the specular reflective surface. An optical sensor receives the reflected beam from the specular reflected surface, forming a light spot on the sensor. The optical sensor provides a sensor signal from which location information of the light spot on the sensor is obtainable. The optical sensor comprises an array of photo diode elements. Each photo diode element is configured for providing a photo diode signal to be included in the sensor signal, and comprises a photo sensitive surface having an effective area dimension in a plane transverse to the beam direction which is smaller than the cross sectional area of the reflective beam. Thereby, the effective area is smaller than the size of the light spot.

22 Claims, 9 Drawing Sheets

(56) References Cited

OTHER PUBLICATIONS

International Search Report—PCT/NL2021/050675—mailing date Feb. 7, 2022.

* cited by examiner

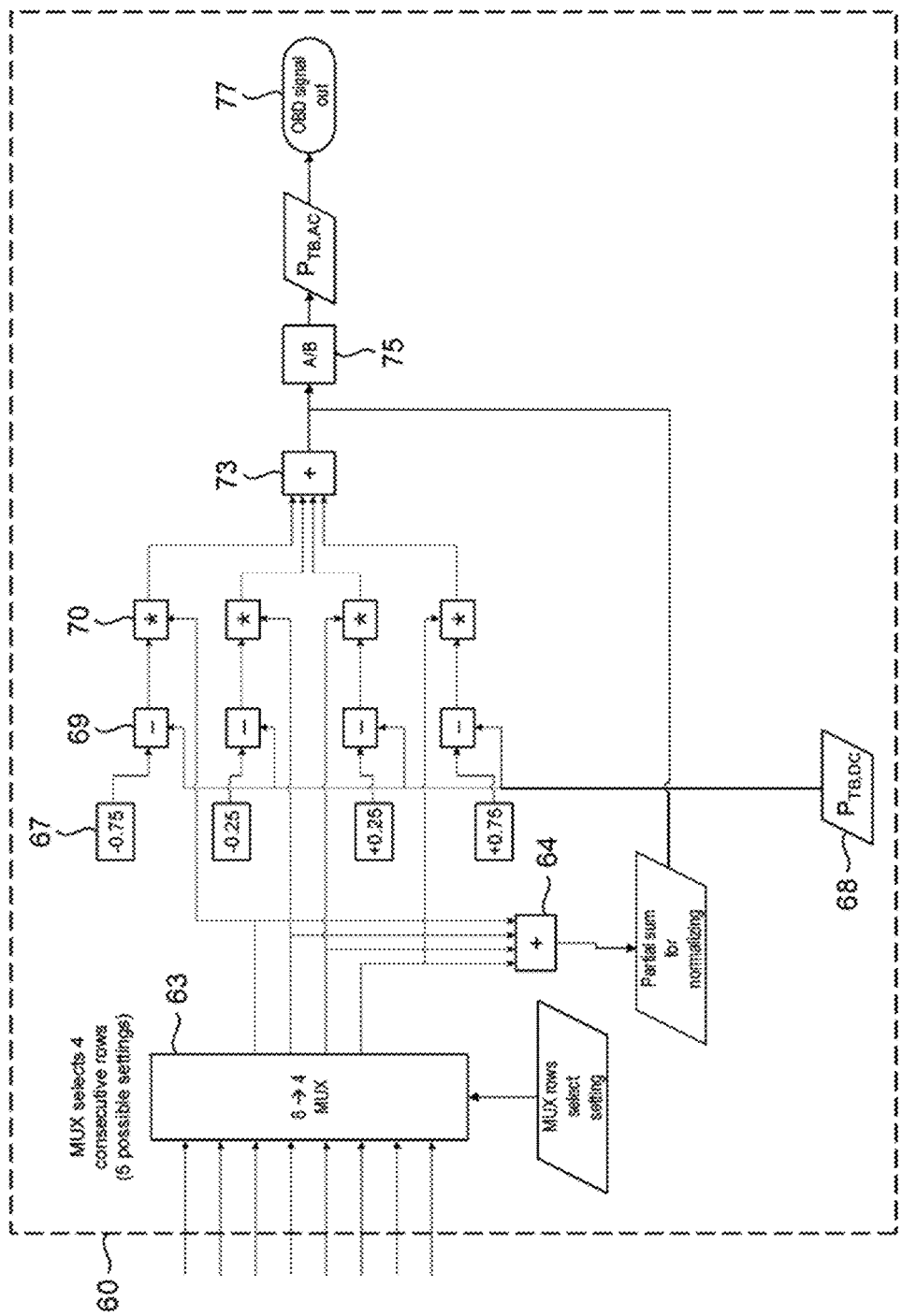
Fig. 6, Cont'd

ARRANGEMENT FOR AND METHOD OF DETERMINING CANTILEVER DEFLECTION IN A SCANNING PROBE MICROSCOPY SYSTEM

CROSS-REFERENCE TO RELATED APPLICATIONS

This application is a U.S. National Stage application under 35 U.S.C. § 371 of International Application PCT/NL2021/050675 (published as WO 2022/098234 A1), filed Nov. 3, 2021, which claims the benefit of priority to Application NL 2026823, filed Nov. 4, 2020. Benefit of the filing date of these prior applications is hereby claimed. Each of these prior applications is hereby incorporated by reference in its entirety.

FIELD OF THE INVENTION

The present invention is directed at an arrangement for determining cantilever deflection in a scanning probe microscopy system, the scanning probe microscopy system including a scan head supporting a probe, the probe including the cantilever and a probe tip, wherein at least one side of the cantilever or the probe tip comprises a specular reflective surface, and wherein the arrangement comprises: an optical source for providing an optical beam, wherein the arrangement is configured for impinging the optical beam onto the specular reflective surface such as to yield a reflected beam which is reflected from the specular reflective surface; and an optical sensor, wherein the arrangement is configured for receiving the reflected beam with the optical sensor for forming a light spot on the optical sensor, the optical sensor being configured for providing a sensor signal from which location information of a location of the light spot on the optical sensor is obtainable.

The invention is further directed at a scanning probe microscopy system, a method of determining cantilever deflection, and a computer program product.

BACKGROUND

Scanning probe microscopy (SPM) systems, such as an atomic force microscopes (AFM), typically apply optical beam deflection to determine cantilever deflection. The method is more or less as described above. In an optical beam detector (OBD) arrangement, usually a laser beam is reflected by a specular reflective surface at the back side of a probe tip or cantilever. This may be achieved by suitably placing and orienting the optical source, or by including optics such as objectives, mirrors, or optical elements that modify the path of the optical beam, such that the beam is oriented towards the specular reflective surface of the cantilever. The reflected beam falls onto an optical sensor which enables to accurately determine the position of the light spot formed by impingement of the reflective beam on the surface of the sensor. The optical sensor, referred to as position sensitive detector (PSD), typically is formed by quadrant cell. A quadrant cell contains four contiguous cells, the edges of which together form a cross. The system is tuned such that the light spot of the reflected beam coincides with the cross, such that the amount of light caught by each of the cells together enables to determine exactly where the center of the light spot is located. The cells provide a sensor signal indicative of the amount of light received, and the ratios between the signals of the cells enable to determine the position of the center of the light spot (assuming the shape of the spot is known, e.g. a circular spot). Very small deflections of the cantilever, due to a leverage over the distance between the probe tip and the quadrant cell, become measurable in this manner.

Where exactly the light spot of the reflected beam is formed, and thus where the 'zero spot' or origin of measurement resides on the sensor surface, depends on the curvature of the cantilever. This curvature may vary a few degrees between individual cantilevers. In an SPM system, due to continuous or intermittent contact between the probe tip and the surface during scanning, the probe tip is subject to wear. Therefore the probe, which consists of the cantilever with the probe tip formed thereon, needs to be replaced frequently. As a consequence of the frequent replacements, the individual differences and other factors, the zero spot needs to be tuned over and over again in order to ensure that it coincides with the cross formed by the cells of the quadrant cell. Furthermore, the signal-to-noise ratio (SNR) of quadrant cell (or plainly 'quad-cell') is largest when the zero spot position optimally falls on center of the cross of the optical sensor. In use during scanning, however, the zero spot position may drift over time for various reasons. This results in a need to adjust the quad-cell position from time to time even in between probe replacements, to prevent that the SNR will deteriorate over time.

To tune the system for the above, the quad-cell position thus needs to be adjusted very accurately and frequently. Several solutions exist in order to mechanically adjust the PSD or quad-cell position to ensure a sufficient SNR as described above. In most SPM systems, manual adjustment screws enable to shift the quad-cell typically in the lateral directions. The quad-cell in these SPM systems may thereby be tuned to ensure that the light spot falls on the center of the cross of the quad-cell. In some sophisticated SPM systems, integrated electro-mechanical actuators enable to perform the tuning automatically. The disadvantages are evident. Manual adjustment slows down the measurement process, is labour intensive and therefore cumbersome. Although these disadvantages are partly overcome by automatic adjustment, the downsides of automatic adjustment are that it adds to the complexity of the system and thus render the system more expensive to manufacture, and even though the adjustment may be performed faster than in the manual case, automatic adjustment still slows down the overall process. For this reason, and in particular for industrial applications which typically demand a high yield, there remains a need for a better alternative.

SUMMARY OF THE INVENTION

It is an object of the present invention to provide an arrangement and method to determine cantilever deflection, which overcomes the above disadvantages, provides an accurate measurement and preferably is unaffected by cantilever replacement.

To this end, there is provided herewith an arrangement as described hereinabove, wherein the optical sensor comprises an array of photo diode elements, wherein each photo diode element is configured for providing a photo diode signal to be included in the sensor signal, and wherein each photo diode element comprises a photo sensitive surface having an effective area dimension in a plane transverse to the beam direction which is smaller than the cross sectional area of the reflective beam, such that the effective area is smaller than the size of the light spot, wherein a first subset of contiguous photo diodes of the array of photo diodes comprises photo diode elements sensitive in a first wavelength range, and wherein a second subset of contiguous photo diodes of the array of photo diodes comprises photo diode elements sensitive in a second wavelength range, wherein the photo diode elements forming the first subset are different from the photo diode elements forming the second subset.

In the arrangement in accordance with the present invention, an array of photo diode elements having sizes smaller than the light spot enables to directly capture the position of the light spot without requiring any adjustment or tuning. In the arrangement of the present invention, due to the size of the photo diode elements which is smaller than the effective beam diameter, the light spot of the beam on the surface of the optical sensor always coincides with more than one photo diode element. Therefore, again assuming a known cross sectional beam shape and hence a known shape of the light spot, the position of the center of the light spot can be determined accurately form the photo diode signals. This may be achieved by, for example, comparing the amounts of light received or their ratios.

In particular the invention enables to provide an optical sensor for an OBD arrangement, comprising different areas that are sensitive to different wavelengths. This allows to use different optical sources in different wavelengths, or to change the wavelength of the optical source without the need for a realigning of the optical sensor for OBD. In many cases, the wavelengths of both beams to be used must be sufficiently different in order to prevent interference. This at least is important in those applications and embodiments wherein more than one optical beam is applied simultaneously.

In the arrangement in accordance with the invention, if the position of the zero spot of the reflected beam on the optical sensor shifts, e.g. due to cantilever exchange or drifting, the light spot always coincides with at least two photo diodes. Therefore, because the photo diode elements have an effective area dimension in a plane transverse to the beam direction which is smaller than the cross sectional area of the reflective beam (and thus also smaller than the light spot), the location of the light spot may always be determined accurately due to the light spot falling upon more than one photo diode at all times.

Preferably, in accordance with some embodiments, the photo diode elements are arranged side-by-side such as to form a sensor surface of the optical sensor. In preferred embodiments, the light sensitive surfaces of the photo diode elements arranged within a plane such as to form a surface of the optical sensor. The photo diode elements in these embodiments are arranged side-by-side, adjacent to each other.

Most preferred, the array of photo diode elements comprises at least two parallel rows or columns of photo diode elements in this way, wherein each row or column preferably includes at least three photo diode elements. Therefore, in some embodiments, the array of photo diode elements comprises an arrangement of N*M photo diode elements, wherein the photo diode elements are arranged in N rows and M columns, and wherein at least one of: N is larger than 2 or M is larger than 2. More preferred, in these embodiments, at least one of N or M is at least 2, whereas the other one of N or M is at least 3. Having more than two photo diode elements in at least one direction (columns or rows), where these photo diodes have effective dimensions smaller than the reflective beam's cross section, allows to easily and immediately detect shifts of the light spot in this direction. Due to the additional photo diode elements in (at least) one direction, a shift of the light spot in these embodiments does not cause the light spot to fall off scale. Instead, the light spot shifts such that it coincides with other photo diode elements, causing the position of it to remain detectable. If the number of photo diodes is large enough, in this way any shift of the light spot remains detectable, and as a result the probe can always be replaced while making the new position of the light spot to become known instantaneously. This overcomes the frequent re-tuning of the OBD arrangement. Furthermore, if the photo diodes elements form a matrix of N by M wherein both N and M are larger than three, not only light spot shifts caused by differences in the cantilever deflection angle are detectable, but also light spot shifts caused by torsion of the cantilever. Hence, this provides for an OBD arrangement that may advantageously be applied in SPM systems applying cantilever torsion e.g. to measure high aspect ratio features on substrate surfaces. A high aspect ratio feature is a structural feature having high walls or deep trenches, which cannot be easily measured and mapped using a standard SPM system.

In the present arrangement, use can be made of either analogue or digital photo diode signals to determine the position of the light spot. For example, the analogue signals of each photo diode may be pre-processed using analogue electronics in order to obtain a signal indicative to determine the position. Such analogue electronics may for example include variable gain amplifiers, followed by analogue normalization and thereafter normalization in a digital domain. In other embodiments, the photo diode signals may be digitized, and the digital signals can be further processed to yield the position of the light source. In some embodiments, the arrangement comprises a digitizer for digitizing the photo diode signals of one or more of the photo diode elements. For example, each photo diode signal may be individually digitized, or the signals of multiple photo diodes are digitized together (e.g. all photo diodes of a same column or row).

In some embodiments, the arrangement further comprises or is configured for cooperating with a controller, wherein the controller is configured for receiving the sensor signal including the photo diode signals, and wherein the controller is configured for processing the sensor signal such as to determine a location of the light spot on the optical sensor. This can be achieved in various ways. A coarse determination may already be obtained by a mere comparison of the photo diode signals, followed by position estimation on the basis of this comparison. However, in other or further embodiments, for determining the location of the light spot on the optical sensor, the controller is configured for performing a centroid calculation based on the photo diode signals. The centroid calculation is of course much more exact in pinpointing the location of the center of the light spot, and can be performed in multiple ways using the photo diode signals as input. In some of these embodiments, the array of photo diode elements comprises an array N*M photo diode elements, wherein the photo diode elements are arranged in N vertically distributed rows and M horizontally distributed columns, and wherein the controller, for performing the centroid calculation in a vertical direction amongst the N rows, is configured for applying the algorithm.

$$P_{TB} = \frac{\sum_{i=1}^{N_{rows}} (W_{TB,segment}i - P_{TB,offset})S_i}{\sum_{i=1}^{N_{rows}} S_i}$$

wherein: i is the row counter indicative of the $i^{th}$ row being considered (where i ranges from 1 to N and i∈ $N$ ); $P_{TB}$ is a spot position coordinate in vertical direction (note that the subscript 'TB' refers to top-bottom); $W_{TB,segment}$ is a normalized segment size being provided by a size of the photo diode elements in vertical direction divided by a row pitch distance of the rows; $P_{TB,offset}$ an offset for enabling to set a zero offset coordinate in the vertical direction; and $S_i$ is either a signal value of the $i^{th}$ photo diode element (i.e. in the $i^{th}$ row) of the column or a row sum value indicative of a sum of the signal values of the photo diode signals of the $i_{th}$ row.

The above algorithm calculates the centroid of the light spot in the vertical direction (top-bottom or column direction). For example, if deflection in only one direction, such as regular cantilever deflection (i.e. ignoring any lateral bending or torsion) is to be considered, it may be sufficient to analyze the shift of the light spot in only one direction which is lined up with the cantilever. The above algorithm may be applied to the signal values of the photo diode signals, which are in the algorithm represented by $S_i$, indicative of the signal value of the photo diode signal of the $i^{th}$ photo diode in the column (note that i is the row counter; hence the $i^{th}$ photo diode in the column is the photo diode element in the respective column that can be found in the $i^{th}$ row). This signal value is indicative of the amount of light received by the respective photo diode element. Therefore, the signal value $S_i$ is a quantification of the photo diode signal of the photo diode, which for example may be a current signal or, if it is converted e.g. by a resistor, a voltage signal that is dependent on the amount of light received by that photo diode element. Typically, the current received from the photo diode element is linearly dependent on the amount of light received, and hence the voltage signal obtained by such analogue conversion will likewise be linearly dependent on the amount of light received. The photo diode signal obtained or converted in this way, may have been digitized using a analogue-to-digital converter (ADC) of any type (e.g. an on-chip ADC such as an ultra-high-speed on-chip ADC, a flash ADC, a half-flash ADC, a successive approximation ADC, a sigma-delta ADC, etc.) to obtain the signal value $S_i$ that may be used in the above algorithm. As an alternative to using the signal value $S_i$ of the photo diode in the $i^{th}$ row of the column, in the vertical direction (i.e. the columns), it is also possible to apply the algorithm to the sum of all signal values $S_{ij}$ (where j ranges from 1 to M and j∈ $N$ ) of the $i^{th}$ row, or an equivalent thereof (e.g. average signal value, or maximum signal value).

If deflection in two directions needs to be analyzed, e.g. also lateral deflection or torsion in addition to regular cantilever deflection, an additional direction may be analyzed by applying a similar algorithm to the horizontal direction (i.e. left-right or row direction). In these embodiments, the array of photo diode elements may comprise an array N*M photo diode elements, wherein the photo diode elements are arranged in M vertically distributed rows and M horizontally distributed columns, and wherein the controller, for performing the centroid calculation in a horizontal direction amongst the M rows, is configured for applying the algorithm $$P_{LR} = \frac{\sum_{j=1}^{M_{columns}} (W_{LR,segment} j - P_{LR,offset}) S_j}{\sum_{j=1}^{M_{columns}} S_j}$$

wherein: j is the column counter indicative of the $j^{th}$ row being considered (where j ranges from 1 to M and j∈ $N$ ); $P_{LR}$ is a spot position coordinate in horizontal direction (wherein the subscript 'LR' refers to left-right); $W_{LR,segment}$ is a normalized segment size being provided by a size of the photo diode elements in horizontal direction divided by a column pitch distance of the columns; $P_{LR,offset}$ an offset for enabling to set a zero offset coordinate in the horizontal direction; and $S_j$ is either a signal value of the $j^{th}$ photo diode element (i.e. in the $j^{th}$ column) of the row or a column sum value indicative of a sum of the signal values of the photo diode signals of the $j_{th}$ column.

The above algorithm calculates the centroid of the light spot in the horizontal direction (top-bottom or column direction). The above algorithm may be applied to the signal values of the photo diode signals, which are in the algorithm represented by $S_j$, indicative of the signal value of the photo diode signal of the $j^{th}$ photo diode in the row (note that j is the column counter; hence the $j^{th}$ photo diode in the row is the photo diode element in the respective row that can be found in the $j^{th}$ column). This signal value is indicative of the amount of light received by the respective photo diode element. Therefore, the signal value $S_j$ is a quantification of the photo diode signal of the photo diode element, which for example may be a current signal or, if it is converted e.g. by a resistor, a voltage signal that is dependent on the amount of light received by that photo diode element. Typically, the current received from the photo diode element is linearly dependent on the amount of light received, and hence the voltage signal obtained by such analogue conversion will likewise be linearly dependent on the amount of light received. The photo diode signal obtained or converted in this way, may have been digitized using a analogue-to-digital converter (ADC) of any type (e.g. an on-chip ADC such as an ultra-high-speed on-chip ADC, a flash ADC, a half-flash ADC, a successive approximation ADC, a sigma-delta ADC, etc.) to obtain the signal value $S_j$ that may be used in the above algorithm. As an alternative to using the signal value $S_j$ of the photo diode element in the $j^{th}$ column of the row, in the horizontal direction (i.e. the rows), it is also possible to apply the algorithm to the sum of all signal values $S_{ij}$ (where i ranges from 1 to N and i∈ $N$ , as above) of the $j^{th}$ column, or an equivalent thereof (e.g. average signal value, or maximum signal value).

The skilled person may appreciate that the array of photo diode elements may be of any desired size, e.g. in terms of numbers of photo diode elements in the array.

In some embodiments, the controller is configured for performing a time dependent analysis of the photo diode signals, wherein a time dependency of the photo diode signals of at least two photo diode elements is compared to identify intensity variations of the light source. For example, the photo diode signals of multiple or even all photo diode elements may be analyzed time dependently, and compared with each other in order to identify intensity variations of the optical source (e.g. a laser).

In some embodiments, the arrangement is further configured for filtering the photo diode signals such as to only include photo diode signals associated with photo diodes that at least partially coincide with the light spot. By excluding those photo diode signals that are too weak (e.g. having an absolute value below a threshold), it is prevented that the accuracy of the position determination is deteriorated by noise from photo diodes that are not illuminated by the reflected beam. Filtering may be achieved in various ways. For example, in some embodiments, for performing the filtering the arrangement comprises at least one of: an analogue or digital multiplexer, one or more high-pass filters, or a digital filter. A multiplexer may be used to analyze groups of channels (i.e. wherein the channels are formed by row sums of photo diode signals, column sums of photo diode signals, or photo diode signals of individual photo diode elements). High pass filters or digital filters may be applied to e.g. each photo diode signal to only pass those signals that are above a threshold. In some embodiments, for performing the filtering the controller is configured for at least one of: comparing the photo diode signals with a threshold, setting each photo diode signal having a signal value below the threshold to zero, or selecting photo diode signals having a signal value above the threshold. The filtering may be performed by the controller, e.g. by setting the weak signals to zero for example.

In some embodiments of the present invention, the optical source comprises one or more optical sources for providing a first optical beam at a first wavelength and a second optical beam at a second wavelength, wherein the arrangement is configured for impinging the first optical beam and the second optical beam onto the specular reflective surface such as to yield a first reflected beam and a second reflected beam, and for impinging the first reflected beam on the first subset of contiguous photo diodes of the array and the second reflected beam on the second subset of contiguous photo diodes of the array. As may be appreciated, typically the first and second optical beam will be formed by different optical sources, which are in many cases monochromatic (e.g. lasers). However in some embodiments a same polychromatic optical source may provide both the first as well as the second optical beam. For example, a splitter and subsequent filter may provide separate beams from a same source, providing a broadband optical spectrum. There are multiple applications wherein this may be advantageously applied.

For example, in some embodiments, the specular reflective surface is located on both middle area of the cantilever, close to the cantilever's base, and the end area of the cantilever, underneath the probe tip, and the arrangement is configured for impinging the first optical beam onto the end area of the cantilever and the second optical beam onto the middle area of the cantilever, for providing the first reflected beam and the second reflected beam. In these embodiments, the first optical beam provides the probe tip sensor signal indicative of probe tip deflection. The additional second optical beam is impinged the middle area of the cantilever in order to obtain information on certain harmonic modes. The location on the cantilever may be selected and set in order to be most responsive to a certain mode. For example, where the ground mode (mode 1) is most strongly sensed at the probe tip, the first harmonic mode (mode 2), the second harmonic mode (mode 3), and the third harmonic mode (mode 4) are strongest in other locations along the length of the cantilever. Therefore, using this embodiment of the present invention, it is possible to perform very efficient and simultaneous measurement of multiple vibration modes of the probe during scanning. This has many applications.

In other or further embodiments, the probe is supported on a probe chip that bears the probe, wherein the specular reflective surface is located on the probe tip and a further specular reflective surface is located on the probe chip, and wherein the arrangement is configured for impinging the first optical beam onto the probe tip and the second optical beam onto the probe chip, for providing the first reflected beam and the second reflected beam. These embodiments allow to monitor the chip dynamics, which for example may be used to filter these from the dynamics of the probe tip. For example, the chip dynamics may be subtracted from the probe tip dynamics to account for all kinds of disturbing dynamic signals in the arrangement, thus improving sensing accuracy.

In yet further embodiments, the arrangement is configured for impinging the first optical beam and the second optical beam onto a same area of the specular reflective surface of the probe tip or the cantilever, and the optical sensor is configured for providing the sensor signal from at least one of the first or second subset of contiguous photo diodes, preferably from at most one of the first or second subsets of photo diode elements at a time. These embodiments provide advantages of a whole different nature. In particular, these embodiments, a single one of the different optical beams may be applied at a time, which is formed of optical energy of a specific wavelength that matches a wavelength for which a coating on the probe is responsive. Different probes may be provided with different coatings, depending on e.g. their requirements of functionality. In these embodiments, different probes may be applied having different such coatings, while enabling use of the same arrangement and without having to realign the optical sources upon changing the probe. For example, when different used cantilevers have different coatings, with different coefficients of reflection, for each type of cantilever coating the corresponding laser can be used to maximize the reflected intensity and, therefore, sensitivity. Multiple pre-aligned lasers and the sensor with multiple subsets of photodiodes make the operation of the scanning probe microscope quick because it is not needed to realign the system for a different type of cantilever.

In yet further embodiments, the arrangement comprises a plurality of probes, wherein each probe comprises a cantilever and a probe tip at least one of which includes the specular reflective surface, such that each probe comprises a specular reflective surface. The arrangement in these embodiments is configured for impinging the first optical beam onto the probe tip or the cantilever of a first probe of the plurality of probes, for impinging the second optical beam onto the probe tip or the cantilever of a second probe of the plurality of probes, for providing the first reflected beam and the second reflected beam. The probe chip of the scanning probe microscopy system may have multiple cantilevers on the same chip. In that case, multiple lasers can be focused on a separate cantilever and reflected to the corresponding subset of photodiodes. This method of sensing will allow to execute different scanning techniques (i.e. FFTP mode, AM mode) without any kind of mechanical realignment. Moreover, it is important to know the offset between those multiple cantilevers, which can be easily calibrated in this case, since the cantilevers do not change their mutual alignment between measurements.

As explained above, the photo diode elements have an effective area dimension in a plane transverse to the beam direction which is smaller than the cross sectional area of the reflective beam (and thus also smaller than the light spot). In some embodiments, for one or more photo diodes, a ratio between the effective area dimension of the photo sensitive surface in the plane transverse to the beam direction and the cross sectional area of the reflective beam is between 0.3 and 1.0, preferably between 0.4 and 0.75, more preferable between 0.4 and 0.6, and even more preferable between 0.4 and 0.45. The size of the photo diode elements preferably is such that a sufficient resolution is obtained, while at the same time a sufficiently strong signal is obtained when a photo diode element is illuminated. Making the photo diode elements too small will cause the photo diode signals to become too small as well, thereby deteriorating the SNR. Making the photo diode elements large will yield a strong signal but decreases the resolution in terms of position determination. Applying multiple small photo diode elements on the other hand provides additional information on the reflective beam and light spot formed. For example, small photo diodes enable analysis of the beam shape or light spot shape, which may be used to correct for optical distortions such as aberrations caused by optical elements, for example.

In accordance with a second aspect, the invention provides a scanning probe microscopy system comprising at least one scan head, a substrate carrier for supporting a substrate, wherein the scan head comprises a probe including a cantilever and probe tip for scanning of a surface of the substrate for performing measurements on the substrate, wherein the scan head further includes an arrangement as described above for determining cantilever deflection of the cantilever.

In accordance with a third aspect, the invention provides a method of determining cantilever deflection in a scanning probe microscopy system, the scanning probe microscopy system including a scan head supporting a probe, the probe including the cantilever and a probe tip, wherein at least one side of the cantilever or the probe tip comprises a specular reflective surface, and wherein the method comprises: providing an optical beam using an optical source, and impinging the optical beam onto the specular reflective surface such as to yield a reflected beam which is reflected from the specular reflective surface; and receiving the reflected beam with an optical sensor to thereby form a light spot on the optical sensor, and providing a sensor signal from which location information of a location of the light spot on the optical sensor is obtainable; wherein the sensor signal is provided by photo diode signals of a plurality of photo diode elements from an array of photo diode elements, and wherein a cross section of the reflective beam is larger than an effective area dimension of a photo sensitive surface of each photo diode in a plane transverse to the beam direction of the reflective beam, such that the effective area is smaller than the size of the light spot, wherein the sensor signal is provided by at least one of: a first subset of contiguous photo diodes of the array of photo diodes comprising photo diode elements sensitive in a first wavelength range, and a second subset of contiguous photo diodes of the array of photo diodes comprises photo diode elements sensitive in a second wavelength range, wherein the photo diode elements forming the first subset are different from the photo diode elements forming the second subset.

Here, in some embodiments, the array of photo diode elements comprises an array N*M photo diode elements, wherein the photo diode elements are arranged in N vertically distributed rows and M horizontally distributed columns, and wherein, using a controller, the sensor signal comprising the photo diode signals is processed to determine a location of the light spot on the optical sensor. In some of these embodiments, for determining said location of the light spot a centroid calculation is performed by the controller, wherein at least one of: the controller, for performing the centroid calculation in a vertical direction amongst the N rows, applies an algorithm $$P_{TB} = \frac{\sum_{i=1}^{N_{rows}} (W_{TB,segment} i - P_{TB,offset}) S_i}{\sum_{i=1}^{N_{rows}} S_i}$$

wherein (equivalent as above): i is the row counter indicative of the $i^{th}$ row being considered; $P_{TB}$ is a spot position coordinate in vertical direction; $W_{TB,segment}$ is a normalized segment size being provided by a size of the photo diode elements in vertical direction divided by a row pitch distance of the rows; $P_{TB,offset}$ an offset for enabling to set a zero offset coordinate in the vertical direction; and $S_i$ is either a signal value of the $i^{th}$ photo diode element (i.e. in the $i^{th}$ row) of the column or a row sum value indicative of a sum of the signal values of the photo diode signals of the $i_{th}$ row. Alternatively or additionally, the controller, for performing the centroid calculation in a horizontal direction amongst the M columns, applies an algorithm $$P_{LR} = \frac{\sum_{j=1}^{M_{columns}} (W_{LR,segment} j - P_{LR,offset}) S_j}{\sum_{j=1}^{M_{columns}} S_j}$$

wherein (equivalent as above): j is the column counter indicative of the $j^{th}$ row being considered; $P_{LR}$ is a spot position coordinate in horizontal direction; $W_{LR,segment}$ is a normalized segment size being provided by a size of the photo diode elements in horizontal direction divided by a column pitch distance of the columns; $P_{LR,offset}$ an offset for enabling to set a zero offset coordinate in the horizontal direction; and $S_j$ is either a signal value of the $j^{th}$ photo diode element (i.e. in the $j^{th}$ column) of the row or a column sum value indicative of a sum of the signal values of the photo diode signals of the $j_{th}$ column.

In some embodiments, the method may further include performing a time dependent analysis of the photo diode signals, wherein a time dependency of the photo diode signals of at least two photo diode elements is compared to identify intensity variations of the light source. In some embodiments, the method may further include filtering the photo diode signals such as to only include photo diode signals associated with photo diodes that at least partially coincide with the light spot. Such filtering, in some embodiments, may be performed by at least one of: comparing the photo diode signals with a threshold, setting each photo diode signal having a signal value below the threshold to zero, or selecting photo diode signals having a signal value above the threshold.

In accordance with a fourth aspect, there is provided a computer program product suitable for loading into a memory of an analysis system of a scanning probe microscopy system, comprising instructions for enabling a controller of the analysis system to perform a method as described above in accordance with the third aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
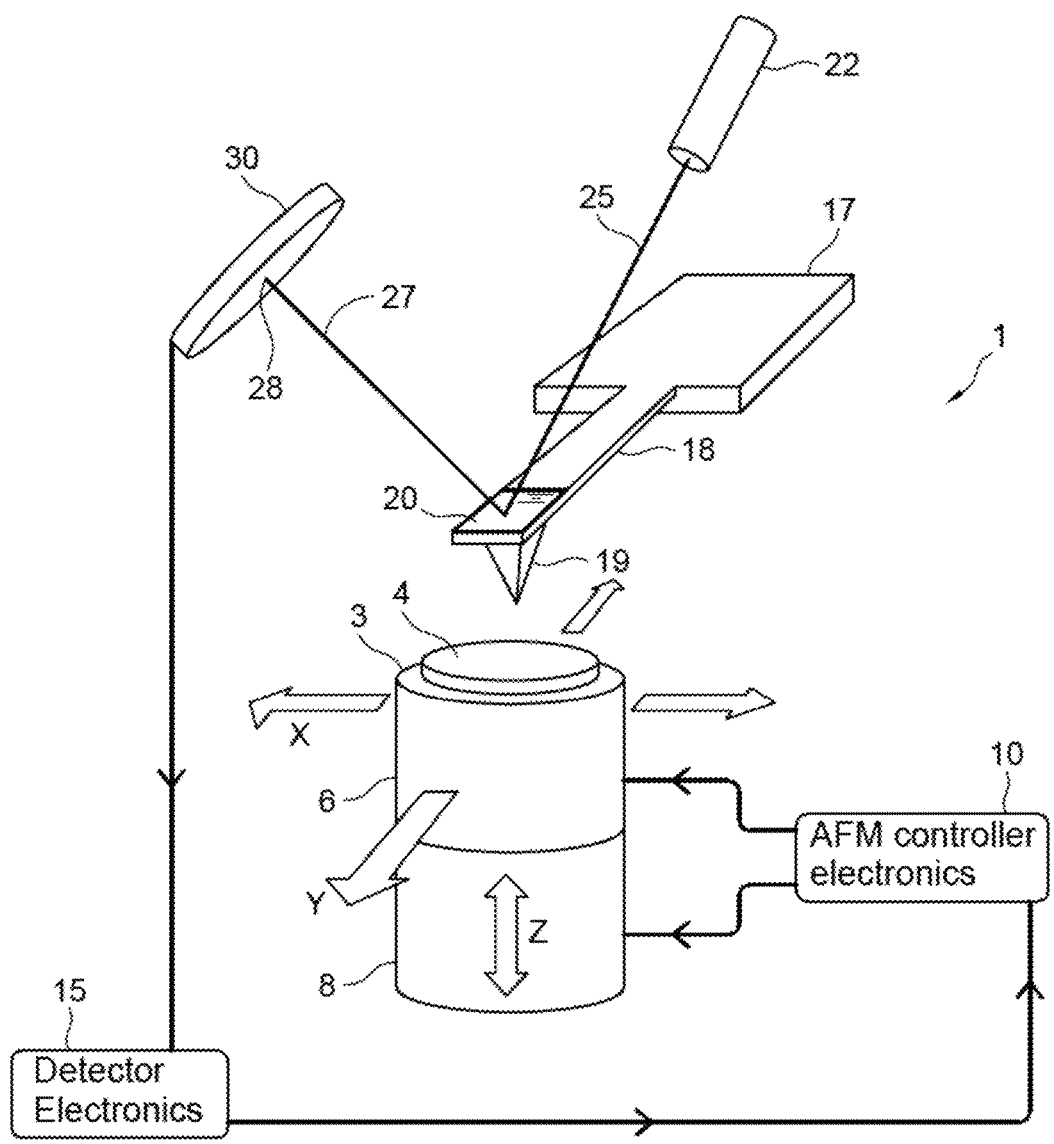
FIG. 1 schematically illustrates a scanning probe microscopy system wherein the arrangement of the present invention may be applied.

In FIG. 1, the principles of a scanning probe microscopy system 1 are schematically illustrated. The scanning probe microscopy system 1 comprises a sample stage 3 onto which a substrate sample 4 may be placed. A first actuator system 6 enables to accurately move the sample stage 3 in the X and Y directions as illustrated in FIG. 1. A piezo type actuator system 8 enables to accurately move the sample stage 3 in the vertical direction Z as illustrated in the figure. The actuator system 6 and the piezo type actuator 8 are controlled by controller electronics 10.

In use a probe 17, comprising a cantilever 18 and a probe tip 19, is scanned relative to the surface of substrate 4 while the probe tip 19 is brought in continuous or intermittent contact with the surface of the substrate 4. The scanning in the X and Y direction is performed by the SPM system using controller 10 and actuator system 6. The probe tip 19 is brought in contact with the sample surface 4 by operating the piezo type actuator system 8, for moving the substrate 4 in the Z-direction in order to decrease the distance between the probe tip 19 and the surface. While the substrate 4 and the probe tip 19 move relative to each other in the X and Y directions, the probe tip 19 may optionally be vibrated for enabling said intermittent contact with the surface.

Typically, the height of the substrate surface at the position where the probe tip 19 touches the substrate 4 is very accurately measured by the SPM system 1. By performing such a highly accurate height measurement at each location where the probe tip 19 touches the substrate 4, a map of the topography of the surface of substrate 4 may be provided on which surface structures are visible. To determine this height accurately, the cantilever deflection of cantilever 18 needs to be determined with high precision, in order to enable very accurate and exact determination of the Z location of the apex of probe tip 19 when it touches the surface of substrate 4. To measure this cantilever deflection, an optical beam deflection (OBD) arrangement is applied. For this, on the back side of the probe tip 19, a specular reflective surface 20 such as a mirror surface may be located. This surface 20 is illuminated with an optical beam 25 from a light source 22, typically a laser, which optical beam 25 is impinged on the specular reflective surface 20. A reflected beam 27 emits from the specular reflective surface 20 towards an optical sensor 30. The optical sensor 30 enables to exactly determine the position of a light spot 28 that is formed by the reflected beam 27 on the surface of the optical sensor 30. The detector electronics 15 receives the sensor signal coming from optical sensor 30 and performed an analysis to determine the position of the light spot 28.

Figure 2A:
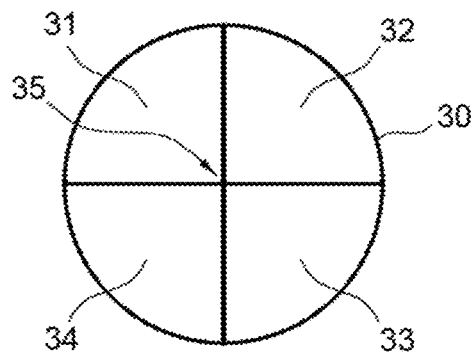
FIGS. 2A and 2B schematically provide a front view and side view of a conventional position sensitive detector.
Figure 2B:
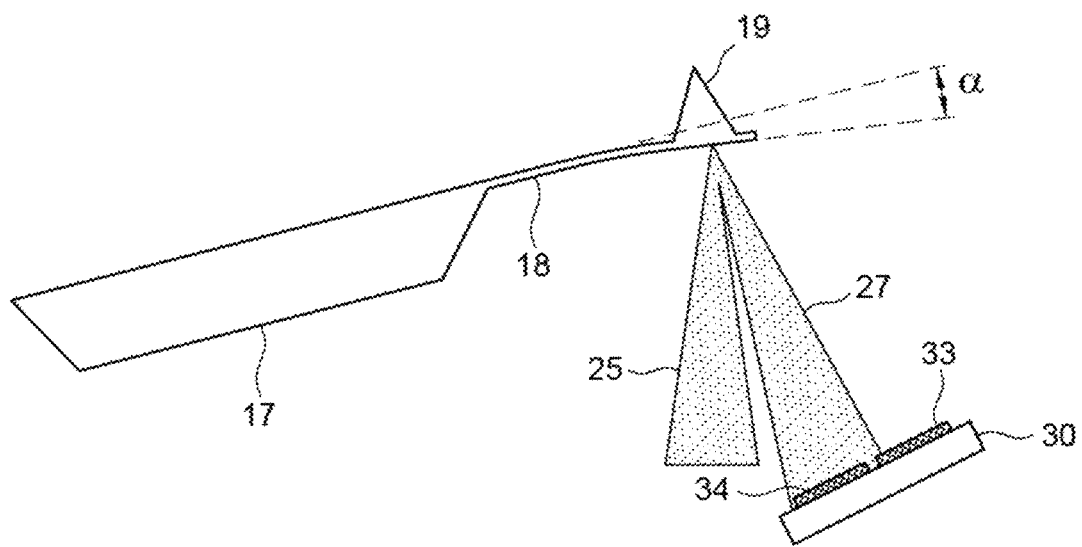

FIGS. 2A and 2B respectively provide a front view of the optical sensor and a side view of the optical beam deflection arrangement (OBD arrangement) wherein the optical sensor 30 is applied. In FIG. 2A, it can be seen that the optical sensor 30 consists of four optical cells 31, 32, 33 and 34. The optical cells 31-34 are arranged adjacent each other, with their edges contiguous to each other to form a cross in the middle of the optical sensor 30.

In FIG. 2B, it can be seen that the incoming beam 25 is reflected towards the optical sensor 30 providing the reflected beam 27. The divergence of the incoming beam 25 and the reflected beam 27 are exaggerated in this figure. Typically, a laser beam 25 is used for forming the light spot 28, and therefore beam divergence is very limited or even negligible. As can be seen in FIG. 1, the reflected beam 27 forms a light spot 28 on surface of the optical detector 30. This light spot 28 in FIG. 2B is located where the reflected beam 27 impinges the surface of the optical sensor 30. In FIG. 2B, optical cells 33 and 34 are illustrated in side view. It further follows from FIG. 2B that the cantilever 18 slightly bends backwards providing a deflection angle α. This may be due to the probe tip 19 touching the surface of substrate 4 (not shown). However, as each probe comes with a slight deviation of +/−1.5 degrees in offset deflection, the angle α in FIG. 2B may as well be this offset deflection. Due to the deflection angle α, the reflected beam 27 is not directed towards the center of the optical sensor 30, but for a major part is formed on cell 34. Cell 33 only receives a small part of the optical energy from reflected beam 27.

Dependent on exactly how the light spot 28 is formed on the optical cells 31, 32, 33 and 34, each of the cells 31-34 receives an amount of light coming from the reflected beam 27. By comparing the magnitude of the sensor signals from each of the cells 31-34, it is possible to determine how well the light spot 28 falls onto the center of the cross 35. Here, optical cell 34 receives a lot of optical energy whereas optical cell 33 only receives a small part of the optical energy. In many conventional SPM systems 1, after each probe exchange and occasionally between scanning operations, the position of the optical sensor 30 is adjusted in order to tune the system such that light spot 28 is formed exactly in the center of cross 35. Thereafter, to measure the local height of the substrate 4 during scanning, the piezo type actuators 8 are controlled for each deflection resulting in a deviation of the light spot 28, such as to bring back the light spot 28 exactly into the center of the cross 35 of the optical sensor 30 again. Using this feedback method, the local height can be measured by registering the modifications in the Z-direction that are applied using the piezo type actuator 8. By registering how much the Z position of the sample stage has been adapted in order to bring back the position of the light spot 28 into the center 35 of the optical sensor 30, the height of the substrate 4 at this specific location is exactly known. As described hereinabove, a disadvantage of these type of optical sensors, is that although the deflection of the cantilever can be determined accurately in this way, the optical sensor 30 must be tuned frequently enable measurement.

Figure 3:
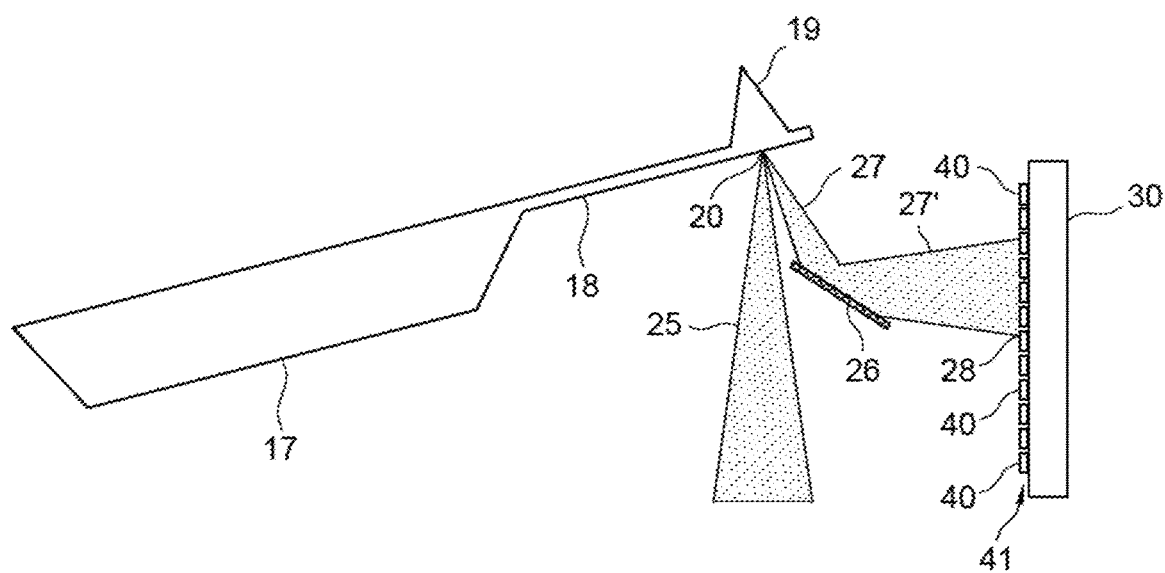
FIG. 3 schematically illustrates an arrangement in accordance with an embodiment of the present invention.

FIG. 3 schematically illustrates an optical beam deflection arrangement in accordance with an embodiment of the present invention. This arrangement may be applied in the system 1 of FIG. 1 or in any other SPM design that applies OBD for measuring cantilever deflection. In FIG. 3, the probe 17 including the cantilever 18 and the probe tip 19 has been illustrated. A specular reflective surface 20 is present on the back side of the probe tip 19, similar to the SPM 1 of FIG. 1. The incoming beam is impinged on the back side of the probe tip 19 and is reflected back as reflected beam 27 towards a foldable mirror 26. The mirror 26 redirects the reflected beam 27' towards the optical sensor 30. This optional mirror 26 is, in the embodiment shown, applied in the design to enable a different placement of the optical sensor 30 such as to allow the optical sensor 30 to be of any desired size. However, in other embodiments, the mirror 26 may be absent and the optical sensor may be well designed to fit in the same location as a conventional optical sensor 30.

Figure 4:
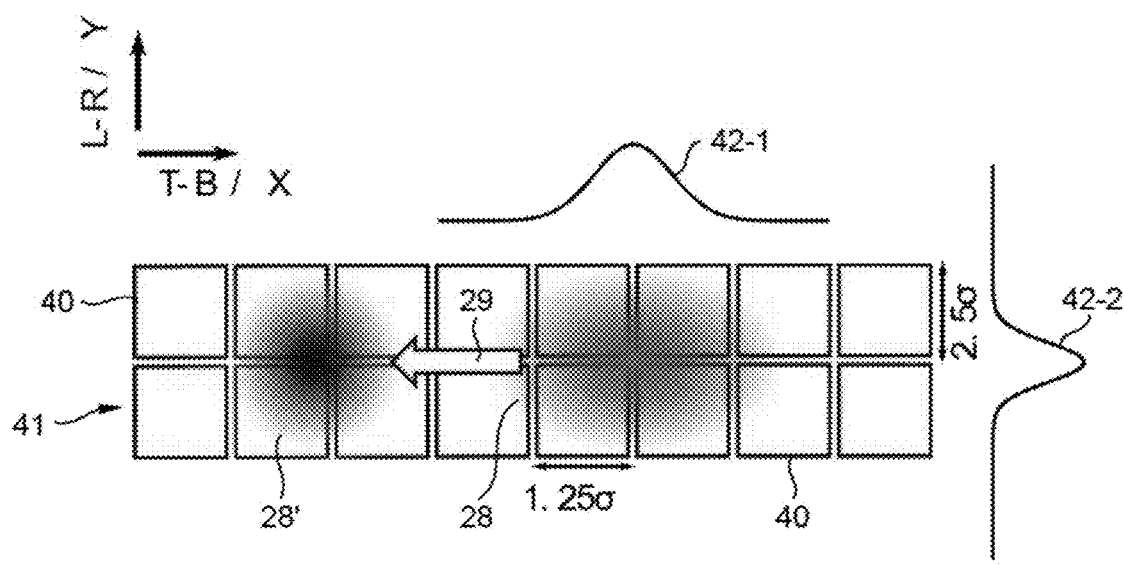
FIG. 4 schematically illustrates an optical sensor for use in an arrangement in accordance with the present invention.
Figure 5:
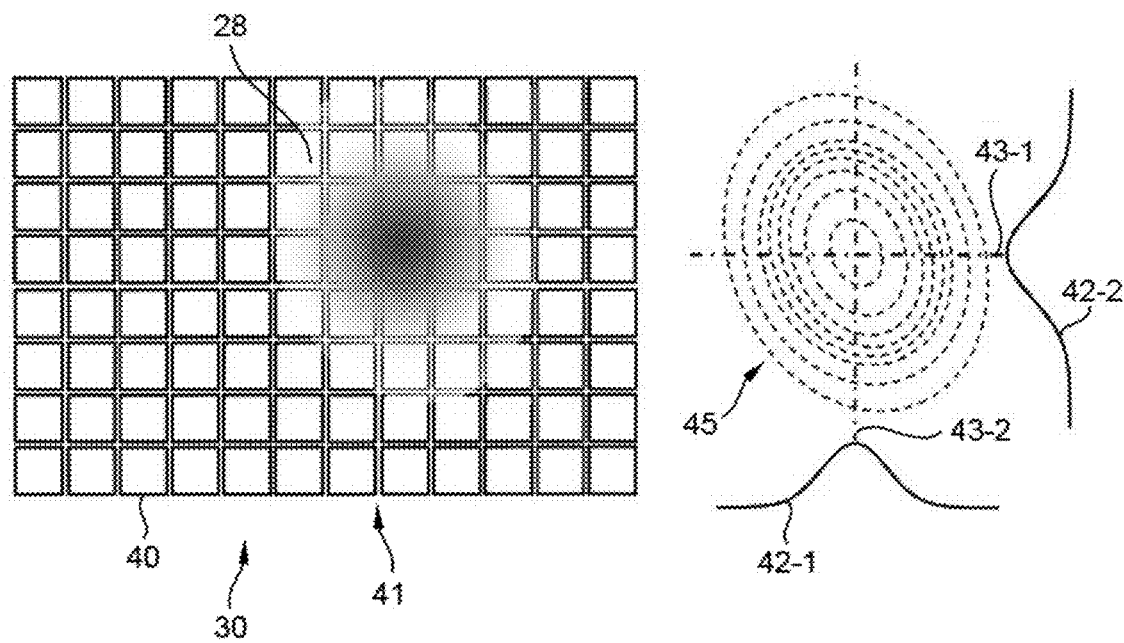
FIG. 5 schematically illustrates an optical sensor for use in an arrangement in accordance with the present invention.

The optical sensor 30 comprises an array 41 of photo diode elements 40. FIGS. 4 and 5 schematically illustrate various configurations of such arrays 41. In accordance with the present invention, the size of the photo diode elements 40 is such that each photo diode element 40 is smaller than the cross sectional diameter of the light spot 28. The light spot 28 which is formed by the reflected beam 27 of the laser beam 25, may have a radius, where the intensity values fall to $1/e^2$ of their axial values, of 0.5 to 1.5 mm. This is merely an exemplary range and is not intended to be limiting on the invention, which may be applied with light spots of different dimensions. In view of this, the photo diode elements 40 are therefore relatively small. In the embodiments of the present invention, the photo diode elements 40 together form an array 41, for example an array consisting of columns and rows as illustrated in FIGS. 4 and 5. Although the number of photo diode elements may be selected as desired, the array 41 at least comprises one column or one row having three or more photo diodes elements 40. In particular, the photo diode element array 41 may consist of an arrangement of N×M photo diode elements, wherein N is the number of rows and M is the number of columns, and wherein at least one of N or M consists of at least three photo diode elements 40, whereas the other of N or M may then consist of at least two photo diode elements 40. Therefore, the smallest array 41 of photo diode elements 40 in accordance with an embodiment of the present invention consists of an arrangement of two by three photo diode elements. However, at will, the array may consist of an arrangement of 10×10 photo diode elements or 20×15 photo diode elements 40 or any other configuration desired. In very particular applications, the number of photo diode elements may even be much larger, for example consisting of 100×50 photo diode elements.

FIG. 4 schematically illustrates a photo diode array 41 in an arrangement in accordance with the present invention. The photo diode array 41 consists of eight photo diode elements 40 in the horizontal direction and two photo diode elements 40 in the vertical direction, thereby forming two rows of eight photo diode elements 40 or eight columns of two photo diode elements 40 dependent on the orientation of the sensor 30. A light spot 28 is illustrated falling onto a plurality of the photo diode elements 40. The light intensity signal profiles 42-1 and 42-2 are illustrated adjacent the figure. When the probe 17, comprising the cantilever 18 and the probe tip 19, is replaced by a new probe the difference in the bending angle of the cantilever 18 of the new probe causes the light spot 28 to shift towards a new position 28', as indicated by the arrow 29. As is clear from FIG. 4, the shift 29 of the light spot 28 does not result in the position of the new light spot 28' to become indeterminable. Due to the fact that the photo diode elements 40 have a size that is smaller than the diameter of the light spot 28 and 28', the light spots 28 and 28' at all times are spread across multiple photo diode elements 40, thereby enabling exact determination of the position of the light spot 28 and 28' on the optical sensor 30. Furthermore, as follows form FIG. 4, and in those implementations where this may be advantageous, it is even possible to form multiple spots 28 on the array 41 of optical sensor 30 and simultaneously determine their positions.

FIG. 5 schematically illustrates an alternative photo diode array 41 consisting of photo diode elements 40. Again, a light spot 28 is illustrated falling onto a plurality of the photo diode elements 40. The light intensity signal profiles 42-1 and 42-2 along the axes 43-1 and 43-2 are illustrated adjacent the figure. The size of the photo diode elements 40 with respect to the size of the light spot 28 is smaller than in FIG. 4, approximately 0.4 times the radius of the light spot 28. Although this is not very well visible, the light spot 28 is not perfectly round but has an oval shape. Due to the fact that the photo diode elements 40 are relatively small compared to the size of the light spot 28, it is possible to accurately determine the shape of the light spot 28. In FIG. 5 the lines of equal intensity 45 are illustrated to the side of the array 41. Clearly from the lines 45 it follows that the shape of the light spot 28 is not round, but slightly oval. Because this may cause a deviation in the determined position, due to the fact that the shape of the light spot is detectable it is possible to correct for this deviation in order to determine the exact location of the center of the light spot. Next to the field lines 45 of equal intensity, the beam profile is illustrated.

Figure 6:
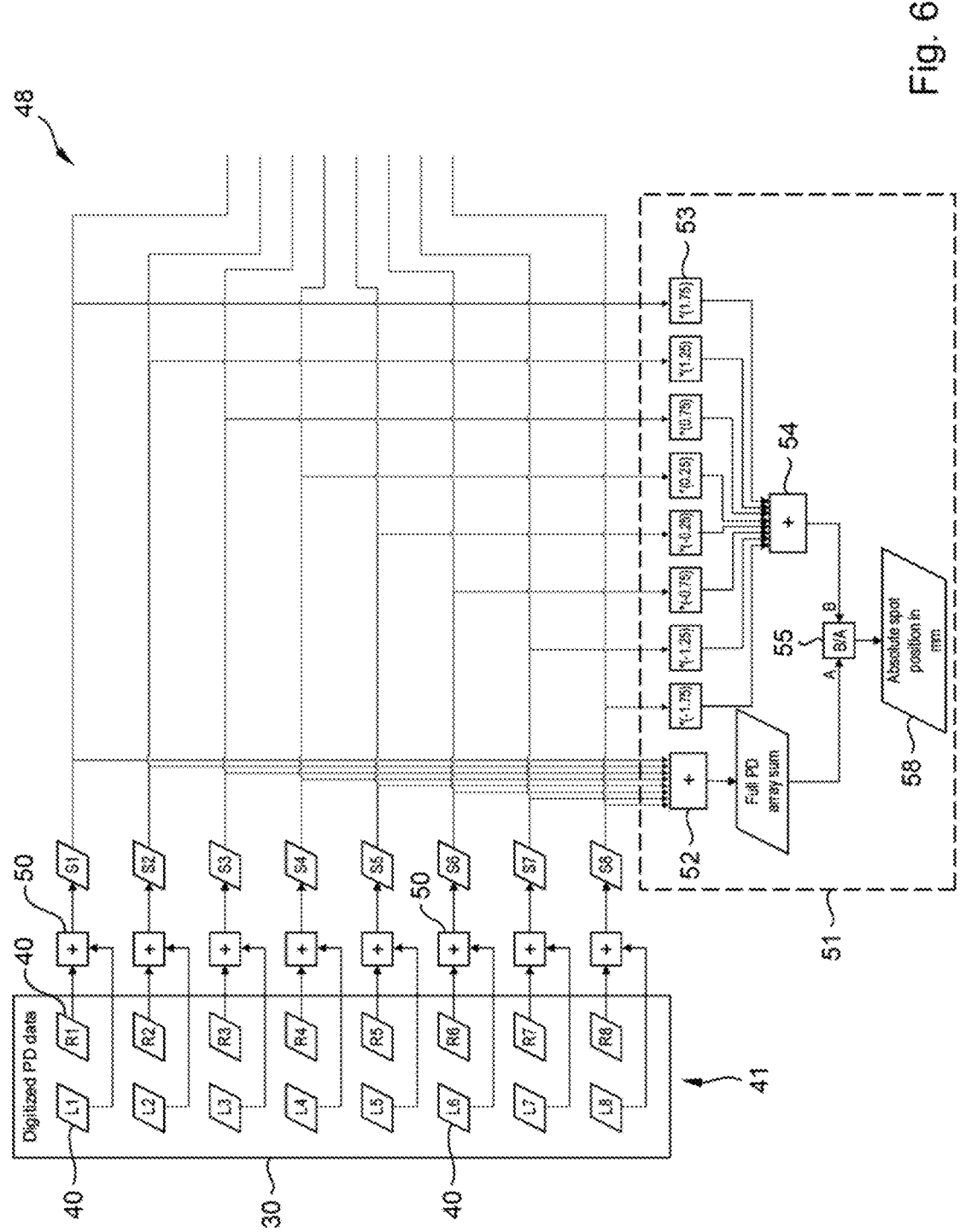
FIG. 6 schematically illustrates a digital signal processing scheme for use in an arrangement in accordance with the present invention.

FIG. 6 schematically illustrates a digital implementation of the signal processing for the OBD arrangement in accordance with an embodiment of the present invention. In FIG. 6, the digital signal processing arrangement 48 connects the photo diode array 41 consisting of photo diodes 40 such that the photo diode signals of each row are sent in the adders 50. In a first part 51 of the digital implementation logic, the signals are further added in adder 52 such as to obtain a total sum of the signals s1 through s8. This total sum will be used for the denominator in the divider 55. Furthermore, each of the row sums obtained from adders 50 is multiplied by the normalized segment size times a factor dependent on the row number, minus an offset as explained hereinbefore. This is done in the multiplier unit 53 for each row. Thereafter, the adder 54 calculates the total sum of the multiplied signal values and provides this to the divider 55 for use in the numerator of the division. The output of the divider 55 will provide the absolute spot position 58 in millimeters. The first part 51 may be used in those cases where the size of the light spot 28 is large compared to the size of the photo diode elements 40, for example in the case illustrated in FIG. 5. However, in those cases where the size of the light spot is relatively small compared to the size of the photo diode elements 40, the digital signal processing logic may be performed in accordance with the part 60 illustrated in FIG. 6. In part 60, a multiplexer 63 uses a subset of the channels s1 through s8 of the row signals and calculates the position of the light spot from these subset of channels. In adder 64, the total sum of the subset is calculated for use in the divider 75. Furthermore, in 68 an offset can be set in the system in order to ensure that the location of the light spot is centered around zero. This offset is deducted in subtractor 69 from a value 67 which represents the normalized segment size multiplied by a factor that is dependent on the row number. Thereafter, the result is multiplied with each of the row signals in multipliers 70 and added in 73 in order to provide the numerator of the divider 75. The divider 75 will provide the position of the light spot as part of the output signal 77 of the optical sensor 30.

Figure 7:
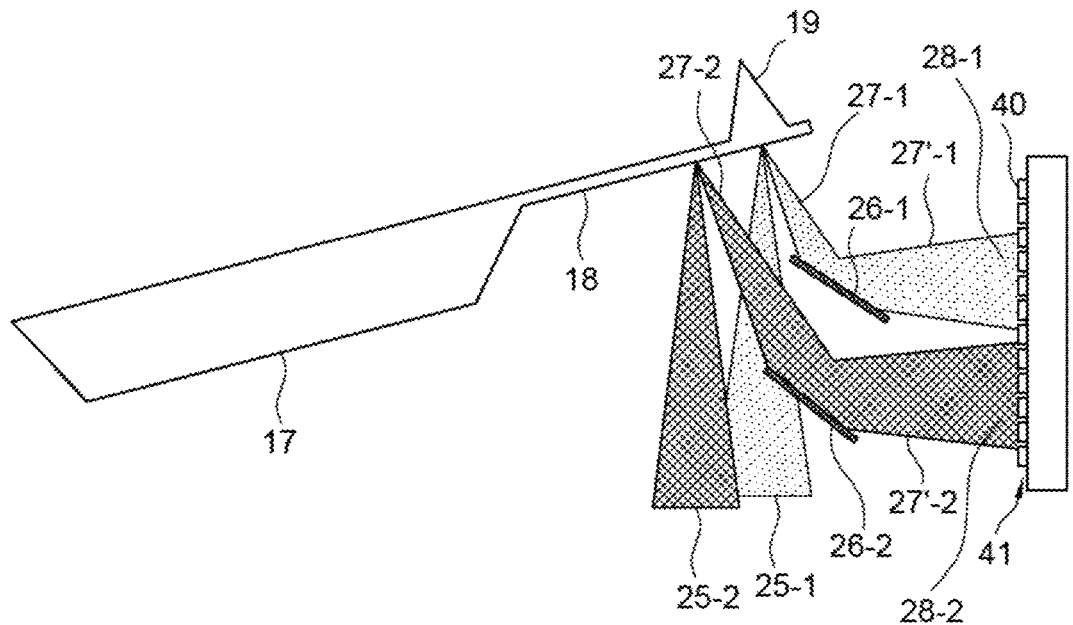
FIG. 7 schematically illustrates an arrangement in accordance with an embodiment of the present invention.

FIG. 7 schematically illustrates an arrangement in accordance with a further embodiment of the present invention. In FIG. 7, a probe chip 17 comprising a probe having a cantilever 18 and a probe tip 7 is illuminated using a first optical beam 25-1 and a second optical beam 25-2. The first optical beam 25-1 is formed of an optical signal at a first wavelength, whereas the second optical beam 25-2 is comprised of an optical signal at a second wavelength. Although these wavelengths may be chosen freely, to prevent interference it is advisable to select the wavelengths to be sufficiently apart. In the embodiment of FIG. 7, the first optical beam 25-1 is directed onto the back side of probe tip 19. A specular reflective surface on the back side of the probe tip 19 reflects the incoming optical beam 25-1 to thereby form reflected beam 27-1. A mirror 26-1 (or a different directing optical element) redirects the reflected optical beam 27-1 towards the photo diode array 41 comprising a plurality of photo diode elements 40 as explained above. The redirected beam is indicated by reference numeral 27'-1. On the array 41, the redirected reflected beam 27'-1 forms a first light spot 28-1 in a first area of the array. The first light spot 28-1 formed in the first area of the array 41 enables to obtain a sensor signal indicative of the deflection of the probe tip 19. The motion and orientation of the probe tip 19 can thereby be measured.

The second optical beam 25-2 is directed on the back side of the cantilever 18, which as well comprises a specular reflected part therefore. This specular reflective part may extend from the probe tip 19 along the whole backside of the cantilever 18, or a part thereof. Alternatively, several specular reflected areas may extend have been formed on this side of the probe. The second optical beam 25-2 is reflected into a reflected beam 27-2, which is redirected using a mirror 26-2 (or another redirecting optical element) onto the array 41. Here, the redirected reflected beam 27'-2 forms a second light spot 28-2. With the signal coming from the photo diode elements 40 in the area where the second light spot 28-2 is formed, it is possible to monitor motion of the cantilever 18. Here, dependent on the particular location where the second optical beam 25-2 impinges, on or more harmonic modes of the probe can be measured. As may be appreciated, alternative to what is illustrated in FIG. 7, more than two optical sensing beams 25 may be directed in this manner to impinge on different parts of the probe tip 19 and cantilever 18. Each location is in a different way sensitive to one or more harmonic modes, and thus the sensing of several locations enables to monitor one or more modes more accurately and simultaneously.

Figure 8:
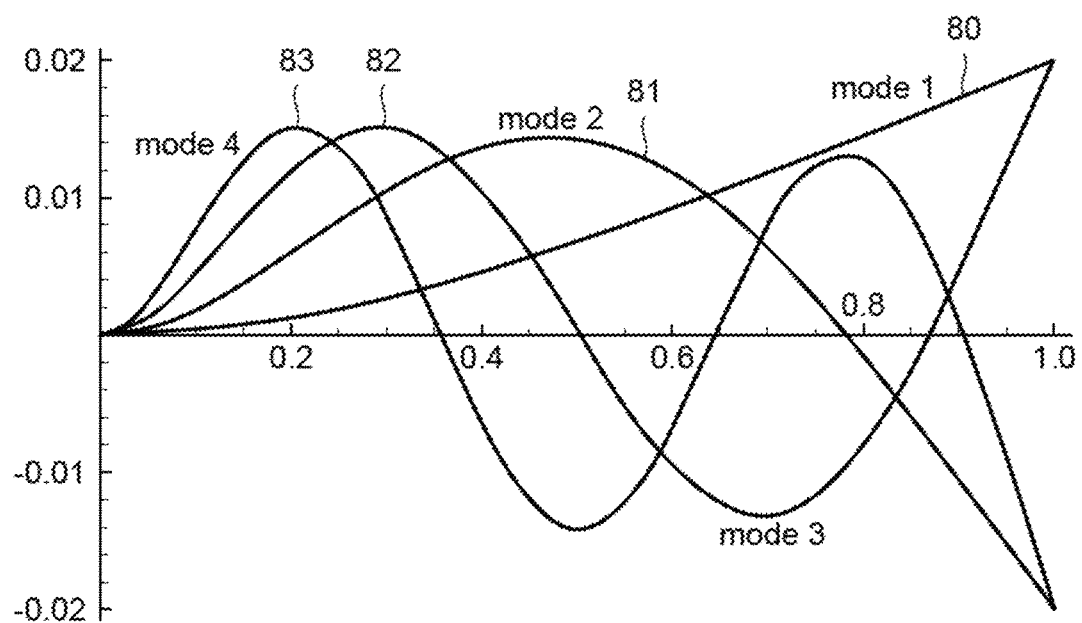
FIG. 8 shows a graph of the various vibrational modes of a cantilever, detectable using the arrangement illustrated in FIG. 3.

FIG. 8 shows a simulation of harmonic modes of a probe, similar to the probe of FIG. 7. The probe is a semi restricted vibrating lever having a free end, being restricted in one end by being fixed to the probe chip 17. In vibration, the free end is able to move freely, thereby mechanically setting a second boundary requirement (the first one being the restricted first end). The ground mode is indicated as 'mode 1' in the graph, and has been designated reference numeral 80. The ground mode is provided by approximately a quarter of a standing wave. This is because due to the above boundary requirement, the free end of the cantilever 18 where the probe tip 19 is located, is moving freely to thereby provide the maximum amplitude locally. The first harmonic mode, which is 'mode 2' in the graph, is characterized by a single belly and a quarter of the next halfwave, i.e. three quarter of a full standing wave, thereby including a the first belly. Furthermore, the second harmonic mode, designated 'mode 3' in the graph, is provided by a single full standing wave plus a quarter of the next full standing wave, hence 1¼ (one and one quarter) of a standing wave including two bellies and a free end. And so on, the third harmonic mode consists of three bellies and a free end, thereby approximately 1% (one and three quarter) of a standing wave.

From the graph in FIG. 8, it becomes clear that at any arbitrary location along the length of the cantilever 18, the mix of local sensitivities with respect to each of the first four modes illustrated is different. At the free end formed by the probe tip 18, all the modes maximally contribute due to the boundary requirement of the free end. At any other point along the cantilever 18, there is always one of the modes being dominantly present. The most optimal location for studying a certain preselected mode may be derived from e.g. FIG. 8. At this point it is also determined what the contributions of other modes is. Thus, different optical beams 25 can be used to monitor different excitation frequencies (modes) of the cantilever 19. The bigger the amplitude of the mode at the point where the second optical beam 25-2 hits the cantilever 19, the more sensitive the obtained sensor signal from spot 28-2 is for this particular mode. By measuring with more than two beams at a corresponding number of locations, the accuracy and amount of information about all these modes improves/increases.

Figure 9:
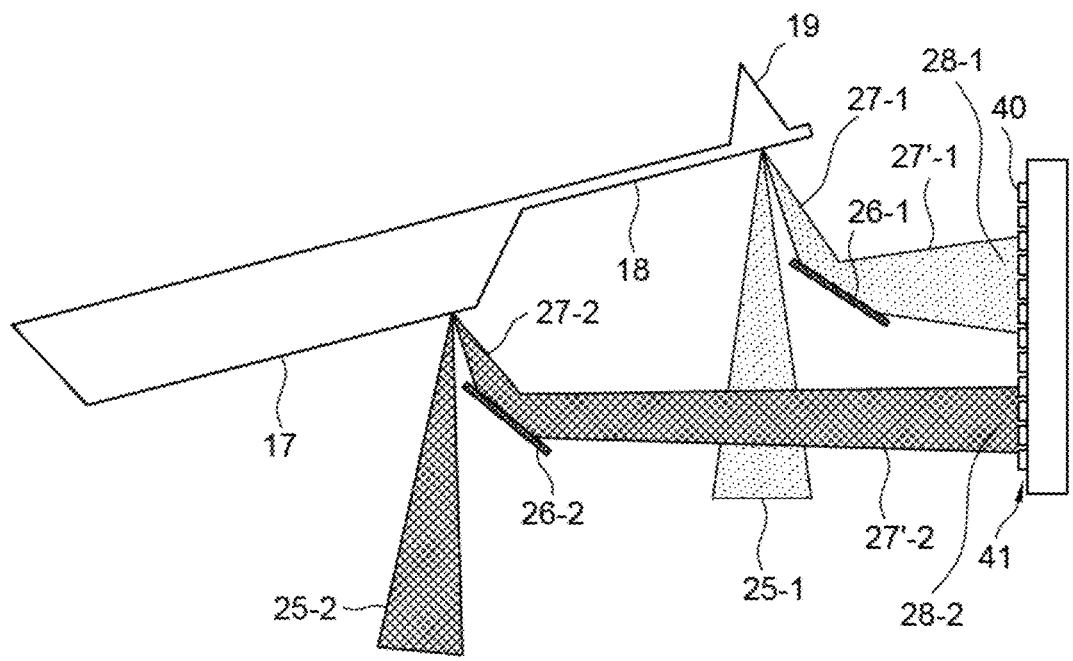
FIG. 9 schematically illustrates an arrangement in accordance with an embodiment of the present invention.

In the embodiment illustrated in FIG. 9, the second beam 25-2 impinges on the probe chip 17. A specular reflected part on the probe chip 17 reflects the beam such as to provide the reflected beam 27-2. This reflected beam 27-2 is redirected using mirror 26-2 (or alternative redirecting optical element) towards the array 41. The redirected reflected beam 27'-2 forms the spot 28-2 on the surface of the array, thereby illuminating the photo diode elements 40 in that area of the array. The sensors 40 illuminated by the redirected reflected beam 27'-2 provide a sensor signal that enables to monitor the dynamic behavior of probe chip 17. As may be appreciated, the dynamic behavior of the probe chip 17 provides a disturbance on the motion of the probe tip 19. Thus, measuring the dynamic behavior of the probe chip 17 enables to remove it from signal indicative of the motion of the probe tip 19, which latter signal is obtained using light spot 28-1 formed by the first beam 25-1. For example, the dynamics of the probe chip 17 may be subtracted from the signal of the probe tip 19, to improve the accuracy of the probe tip signal.

Figure 10:
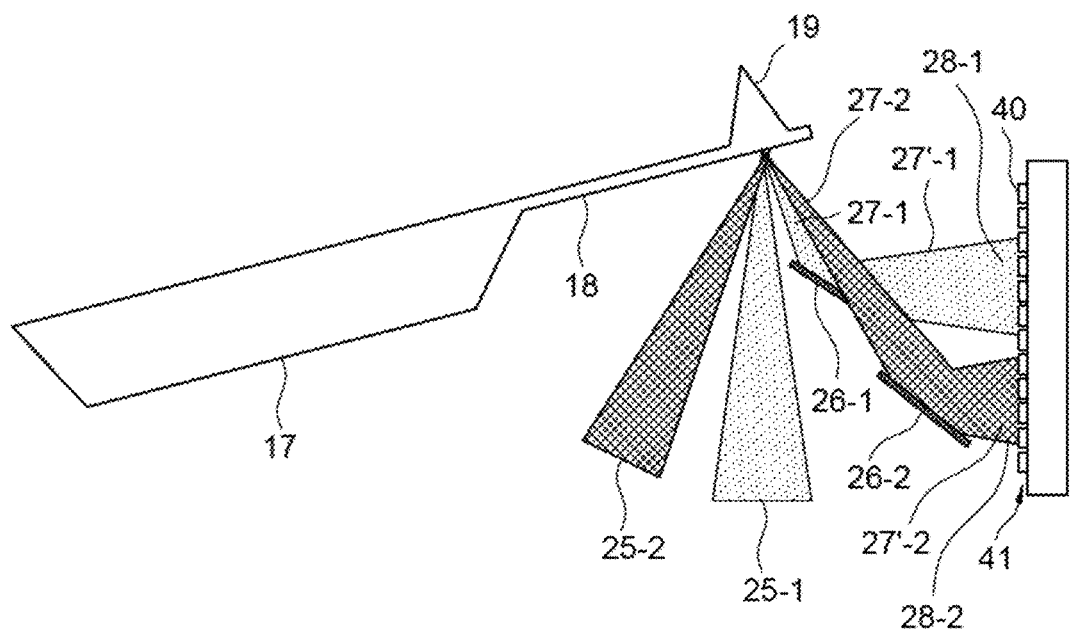
FIG. 10 schematically illustrates an arrangement in accordance with an embodiment of the present invention.

In the embodiment of FIG. 10, both the first optical beam 25-1 and the second optical beam 25-2 impinge on the same spot on the back side of probe tip 19. These optical beams 25-1 and 25-2 are both reflected to respectively provide reflected beams 27-1 and 27-2, which are redirected into 27'-1 and 27'-2 to form two spots 28-1 and 28-2 in different areas on the array 41. The wavelengths of the optical signals of beams 25-1 and 25-2 are different, and are specifically selected in association with the probes to be used in the scanning probe microscopy system. For example, a scanning probe microscopy system 1 may be designed to use several different types of probes subsequently, wherein each type of probe has a different functionality. Such probes may be of different material or may comprise certain coatings on surface 18 that are most responsive to specific wavelengths and less responsive to other wavelengths. In the arrangement illustrated in FIG. 10, the optical beams 25-1 and 25-2 are each responsive to a different wavelength. The wavelengths are selected such as to provide a strong reflected signal in the reflected optical beams 27-1 and 27-2 respectively, for each of the probes respectively. Thus, the wavelength of the first optical beam 25-1 is selected to be a wavelength that is well reflected by the probe tip 19 of the first type of probe. The wavelength of the second optical beam 25-2 is selected to be a wavelength that is well reflected by the probe tip 19 of the second probe type. When the probe of the first type is replaced by the probe of the second type, the second optical beam 25-2 provides an optical signal that is sufficiently well reflected in order to enable measuring the dynamics of the probe tip 19. Therefore, it is not necessary to replace or recalibrate the optical source upon replacement of the probe, making the process of replacing more efficient.

Figure 11:
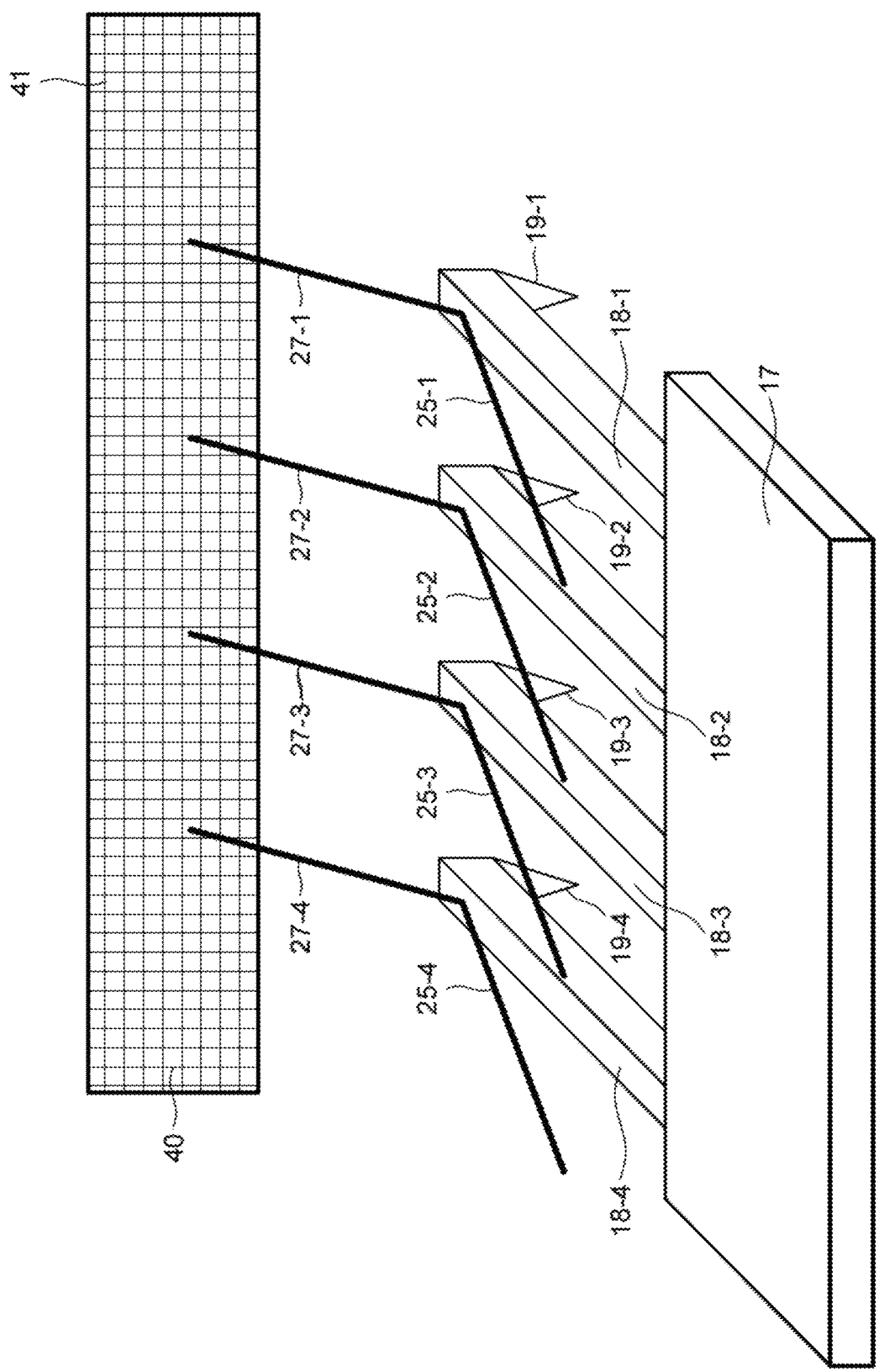
FIG. 11 schematically illustrates an arrangement in accordance with an embodiment of the present invention.

In the embodiment illustrated in FIG. 11, the probe chip 17 includes a plurality of probes that enable to perform simultaneous measurements. In the example illustrated, the probe chip comprises four probes consisting of cantilevers 18-1, 18-2, 18-3 and 18-4. The cantilevers 18-1 to 18-4 each include a probe tip 19-1, 19-2, 19-3 and 19-4. In the illustrated embodiment, a plurality of optical beams 25-1, 25-2, and 25-4 impinge on the back sides of the probe tips 19-1 to 19-4. In this way, each of the probe tips 19-1 to 19-4 is illuminated by one of the incoming optical beams 25-1 to 25-4. The differing wavelengths of the beams 25-1 to 25-4 enables the beams to be sufficiently close to one another without interference to occur. In an arrangement in accordance with the embodiment of FIG. 11, multiple lasers 25-1 to 25-4 can be focused on separate probe tips 19-1 to 19-4, and reflected beams 27-1 to 27-4 will be directed towards to the corresponding subsets of photodiodes 40 of the array 41. This method of sensing will allow to execute different scanning techniques (i.e. FFTP mode, AM mode) without any kind of mechanical realignment. Moreover, it is important to know the offset between the multiple cantilevers 18-1 to 18-4, which can be easily calibrated in this case, since the cantilevers do not change their mutual alignment between measurements. The different scanning techniques referred to above for example may include feed-forward trajectory planner (FFTP) mode. FFTP measures high-aspect ratio structures, for example where the space of trench or hole diameter is less than 20 to 40 nm and the depth is about 200 nm. This mode controls the motion of the probe to such an extent that it minimizes the interaction with sidewalls and ensures it reaches the bottom of such complex structures. Another scanning technique obtainable for example includes dynamic force mode refers to a collection of AFM modes in which the cantilever oscillates at a high frequency at or close to resonance. A specific kind of dynamic mode, referred to as amplitude modulation mode (AM-AFM) is the most common AFM imaging mode. In AM-AFM, the amplitude of oscillation is the feedback parameter; other dynamic modes have different parameters for the feedback loop such as frequency (frequency modulation) or phase (phase modulation). Amplitude modulation mode, tapping mode, intermittent contact mode, and dynamic force mode can be used synonymously.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. An arrangement for determining cantilever deflection in a scanning probe microscopy system, the scanning probe microscopy system including a scan head supporting a probe, the probe including the cantilever and a probe tip, wherein at least one side of the cantilever or the probe tip comprises a specular reflective surface, and wherein the arrangement comprises:
   an optical source for providing an optical beam, wherein the arrangement is configured for impinging the optical beam onto the specular reflective surface such as to yield a reflected beam which is reflected from the specular reflective surface; and
   an optical sensor, wherein the arrangement is configured for receiving the reflected beam with the optical sensor for forming a light spot on the optical sensor, the optical sensor being configured for providing a sensor signal from which location information of a location of the light spot on the optical sensor is obtainable;
   wherein the optical sensor comprises an array of photo diode elements, wherein each photo diode element is configured for providing a photo diode signal to be included in the sensor signal, and wherein each photo diode element comprises a photo sensitive surface having an effective area dimension in a plane transverse to the beam direction which is smaller than the cross sectional area of the reflective beam, such that the effective area is smaller than the size of the light spot,
   wherein a first subset of contiguous photo diodes of the array of photo diodes comprises photo diode elements sensitive in a first wavelength range, and wherein a second subset of contiguous photo diodes of the array of photo diodes comprises photo diode elements sensitive in a second wavelength range, wherein the photo diode elements forming the first subset are different from the photo diode elements forming the second subset.

2. The arrangement according to claim 1, wherein the array of photo diode elements comprises an arrangement of N*M photo diode elements, wherein the photo diode elements are arranged in N rows and M columns, and wherein at least one of: N is larger than 2 or M is larger than 2.

3. The arrangement according to claim 1, wherein the arrangement further comprises or is configured for cooperating with a controller, wherein the controller is configured for receiving the sensor signal including the photo diode signals, and wherein the controller is configured for processing the sensor signal such as to determine a location of the light spot on the optical sensor, wherein for determining the location of the light spot on the optical sensor, the controller is configured for performing a centroid calculation based on the photo diode signals.

4. The arrangement according to claim 3, wherein the array of photo diode elements comprises an arrangement of N*M photo diode elements, wherein the photo diode elements are arranged in N rows and M columns, and wherein at least one of: N is larger than 2 or M is larger than 2, and wherein the controller, for performing the centroid calculation in a vertical direction amongst the N rows, is configured for applying the algorithm:

$$P_{TB} = \frac{\sum_{i=1}^{N_{rows}} (W_{TB,segment} i - P_{TB,offset}) S_i}{\sum_{i=1}^{N_{rows}} S_i}$$

wherein:
   i is the row counter indicative of the $i^{th}$ row being considered;
   $P_{TB}$ is a spot position coordinate in vertical direction;

$W_{TB,segment}$ is a normalized segment size being provided by a size of the photo diode elements in vertical direction divided by a row pitch distance of the rows;

$P_{TB,offset}$ an offset for enabling to set a zero offset coordinate in the vertical direction; and $S_i$ is a row sum value indicative of a sum of the signal values of the photo diode signals of the $i_{th}$ row.

5. The arrangement according to claim 4, wherein the controller, for performing the centroid calculation in a horizontal direction amongst the M rows, is configured for applying the algorithm:

$$P_{LR} = \frac{\sum_{j=1}^{M_{columns}} (W_{LR,segment} j - P_{LR,offset}) S_j}{\sum_{j=1}^{M_{columns}} S_j}$$

wherein:
j is the column counter indicative of the $j^{th}$ row being considered;

$P_{LR}$ is a spot position coordinate in horizontal direction;

$W_{LR,segment}$ is a normalized segment size being provided by a size of the photo diode elements in horizontal direction divided by a column pitch distance of the columns;

$P_{LR,offset}$ an offset for enabling to set a zero offset coordinate in the horizontal direction; and $S_j$ is a column sum value indicative of a sum of the signal values of the photo diode signals of the $j_{th}$ column.

6. The arrangement according to claim 1, wherein the controller is configured for performing a time dependent analysis of the photo diode signals, wherein a time dependency of the photo diode signals of at least two photo diode elements is compared to identify intensity variations of the light source.

7. The arrangement according to claim 1, wherein the arrangement is further configured for filtering the photo diode signals such as to only include photo diode signals associated with photo diodes that at least partially coincide with the light spot.

8. The arrangement according to claim 7, wherein the arrangement further comprises or is configured for cooperating with a controller, wherein the controller is configured for receiving the sensor signal including the photo diode signals, and wherein the controller is configured for processing the sensor signal such as to determine a location of the light spot on the optical sensor, wherein for determining the location of the light spot on the optical sensor, the controller is configured for performing a centroid calculation based on the photo diode signals, and wherein for performing the filtering the controller is configured for at least one of: comparing the photo diode signals with a threshold, setting each photo diode signal having a signal value below the threshold to zero, or selecting photo diode signals having a signal value above the threshold.

9. The arrangement according to claim 1, wherein the optical source comprises one or more optical sources for providing a first optical beam at a first wavelength and a second optical beam at a second wavelength, wherein the arrangement is configured for impinging the first optical beam and the second optical beam onto the specular reflective surface such as to yield a first reflected beam and a second reflected beam, and for impinging the first reflected beam on the first subset of contiguous photo diodes of the array and the second reflected beam on the second subset of contiguous photo diodes of the array.

10. The arrangement according to claim 9, wherein the specular reflective surface is located on both of the cantilever and the probe tip, and wherein the arrangement is configured for impinging the first optical beam onto the probe tip and the second optical beam onto the cantilever, for providing the first reflected beam and the second reflected beam.

11. The arrangement according to claim 9, wherein the probe is supported on a probe chip that bears the probe, wherein the specular reflective surface is located on the probe tip and a further specular reflective surface is located on the probe chip, and wherein the arrangement is configured for impinging the first optical beam onto the probe tip and the second optical beam onto the probe chip, for providing the first reflected beam and the second reflected beam.

12. The arrangement according to claim 9, wherein the arrangement is configured for impinging the first optical beam and the second optical beam onto a same area of the specular reflective surface of the probe tip or the cantilever, wherein the optical sensor is configured for providing the sensor signal from at least one of the first or second subset of contiguous photo diodes.

13. The arrangement according to claim 9, wherein the arrangement comprises a plurality of probes, wherein each probe comprises a cantilever and a probe tip at least one of which includes the specular reflective surface, such that each probe comprises a specular reflective surface, and wherein the arrangement is configured for impinging the first optical beam onto the probe tip or the cantilever of a first probe of the plurality of probes, for impinging the second optical beam onto the probe tip or the cantilever of a second probe of the plurality of probes, for providing the first reflected beam and the second reflected beam.

14. The arrangement according to claim 1, wherein for one or more photo diodes, a ratio between the effective area dimension of the photo sensitive surface in the plane transverse to the beam direction and the cross sectional area of the reflective beam is between 0.3 and 1.0.

15. A scanning probe microscopy system comprising at least one scan head, a substrate carrier for supporting a substrate, wherein the scan head comprises a probe including a cantilever and probe tip for scanning of a surface of the substrate for performing measurements on the substrate, wherein the scan head further includes an arrangement according to claim 1 for determining cantilever deflection of the cantilever.

16. A method of determining cantilever deflection in a scanning probe microscopy system, the scanning probe microscopy system including a scan head supporting a probe, the probe including the cantilever and a probe tip, wherein at least one side of the cantilever or the probe tip comprises a specular reflective surface, and wherein the method comprises:
providing an optical beam using an optical source, and impinging the optical beam onto the specular reflective surface such as to yield a reflected beam which is reflected from the specular reflective surface; and
receiving the reflected beam with an optical sensor to thereby form a light spot on the optical sensor, and providing a sensor signal from which location information of a location of the light spot on the optical sensor is obtainable;
wherein the sensor signal is provided by photo diode signals of a plurality of photo diode elements from an array of photo diode elements, and wherein a cross section of the reflective beam is larger than an effective area dimension of a photo sensitive surface of each photo diode in a plane transverse to the beam direction of the reflective beam, such that the effective area is smaller than the size of the light spot, wherein the sensor signal is provided by at least one of:
a first subset of contiguous photo diodes of the array of photo diodes comprising photo diode elements sensitive in a first wavelength range, and
a second subset of contiguous photo diodes of the array of photo diodes comprises photo diode elements sensitive in a second wavelength range,
wherein the photo diode elements forming the first subset are different from the photo diode elements forming the second subset.

17. The method according to claim 16, wherein the array of photo diode elements comprises an array N*M photo diode elements, wherein the photo diode elements are arranged in N vertically distributed rows and M horizontally distributed columns, and wherein, using a controller, the sensor signal comprising the photo diode signals is processed to determine a location of the light spot on the optical sensor.

18. The method according to claim 17, wherein for determining said location of the light spot a centroid calculation is performed by the controller, wherein at least one of:
the controller, for performing the centroid calculation in a vertical direction amongst the N rows, applies an algorithm:

$$P_{TB} = \frac{\sum_{i=1}^{N_{rows}} (W_{TB,segment} i - P_{TB,offset}) S_i}{\sum_{i=1}^{N_{rows}} S_i}$$

wherein:
i is the row counter indicative of the $i^{th}$ row being considered;
$P_{TB}$ is a spot position coordinate in vertical direction;
$W_{TB,segment}$ is a normalized segment size being provided by a size of the photo diode elements in vertical direction divided by a row pitch distance of the rows;
$P_{TB,offset}$ an offset for enabling to set a zero offset coordinate in the vertical direction; and
$S_i$ is a row sum value indicative of a sum of the signal values of the photo diode signals of the $i_{th}$ row;
or
the controller, for performing the centroid calculation in a horizontal direction amongst the M columns, applies an algorithm:

$$P_{LR} = \frac{\sum_{j=1}^{M_{columns}} (W_{LR,segment} j - P_{LR,offset}) S_j}{\sum_{j=1}^{M_{columns}} S_j}$$

wherein:
j is the column counter indicative of the $j^{th}$ row being considered;
$P_{LR}$ is a spot position coordinate in horizontal direction;
$W_{LR,segment}$ is a normalized segment size being provided by a size of the photo diode elements in horizontal direction divided by a column pitch distance of the columns;
$P_{LR,offset}$ an offset for enabling to set a zero offset coordinate in the horizontal direction; and
$S_j$ is a column sum value indicative of a sum of the signal values of the photo diode signals of the $j_{th}$ column.

19. The method according to claim 16, further including performing a time dependent analysis of the photo diode signals, wherein a time dependency of the photo diode signals of at least two photo diode elements is compared to identify intensity variations of the light source.

20. The method according to claim 16, further including a step of filtering the photo diode signals such as to only include photo diode signals associated with photo diodes that at least partially coincide with the light spot.

21. The method according to claim 20, wherein the filtering performed by at least one of: comparing the photo diode signals with a threshold, setting each photo diode signal having a signal value below the threshold to zero, or selecting photo diode signals having a signal value above the threshold.

22. A non-transitory computer-readable medium for loading into a memory of an analysis system of a scanning probe microscopy system, comprising instructions for enabling a controller of the analysis system to perform the method according to claim 16.

* * * * *